Nov. 22, 1938.   A. M. NICOLSON   2,137,852
PIEZOELECTRIC OSCILLATING AND STRESS-MEASURING MEANS
Filed Jan. 8, 1924   3 Sheets-Sheet 1

Inventor:
Alexander M. Nicolson,
by ─── Att'y

Nov. 22, 1938. A. M. NICOLSON 2,137,852
PIEZOELECTRIC OSCILLATING AND STRESS-MEASURING MEANS
Filed Jan. 8, 1924 3 Sheets-Sheet 3
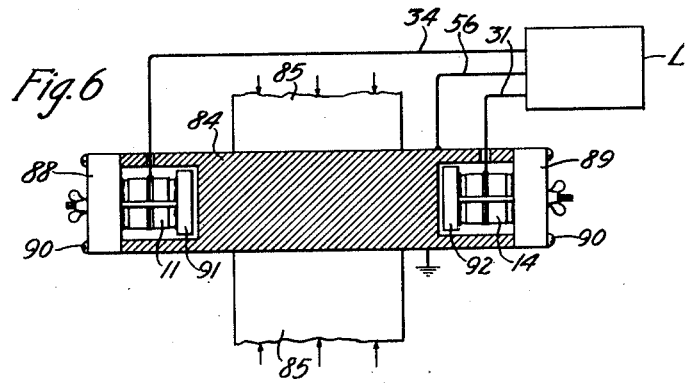
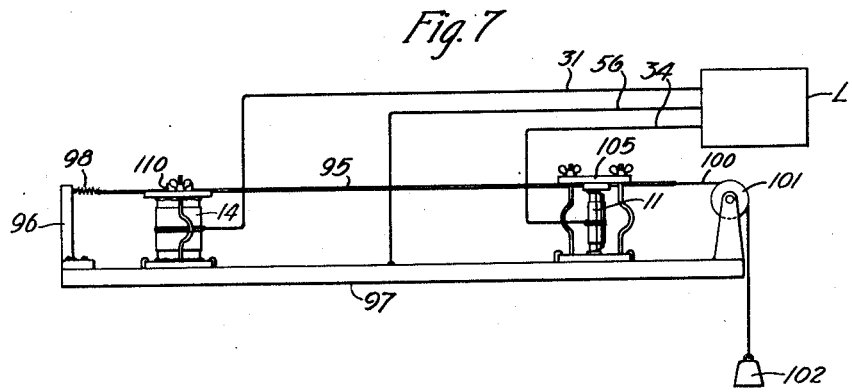
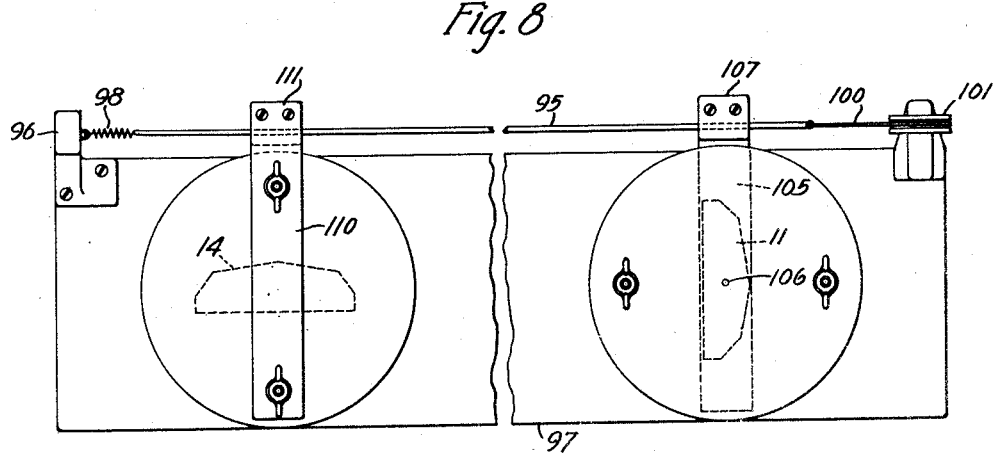
Inventor:
Alexander M. Nicolson,
by E. W. Adam Atty.

Patented Nov. 22, 1938

2,137,852

UNITED STATES PATENT OFFICE 2,137,852

PIEZOELECTRIC OSCILLATING AND
STRESS-MEASURING MEANS

Alexander M. Nicolson, New York, N. Y., assignor to Western Electric Company, Incorporated, New York, N. Y., a corporation of New York Application January 8, 1924, Serial No. 685,010

43 Claims. (Cl. 250—36)

This invention relates to the generation and utilization of electric current oscillations and aims to provide for controlling, that is, governing, the frequency of such oscillations and for utilizing the oscillations in measuring mechanical forces or stresses.

In accordance with the invention, an amplifier, for instance an electron discharge amplifier, is caused to oscillate by coupling its output circuit to its input circuit by two separate piezo-electric bodies connected in energy transfer relation by a mechanical structure or element.

The frequency of oscillation is controlled, or governed by the nature of the element or structure and the conditions under which it operates, one of these conditions being the mechanical forces or stresses to which it is subjected, or its consequent deformation. This dependence of the frequency upon the stresses or deformation to which the element or structure is subjected can be utilized to measure stresses as functions of the frequency, for instance, by means of a calibration curve plotted for the oscillator between observed values of frequency and corresponding known stresses applied to the oscillator and straining or deforming the mechanical coupling element or structure.

Figure 1:
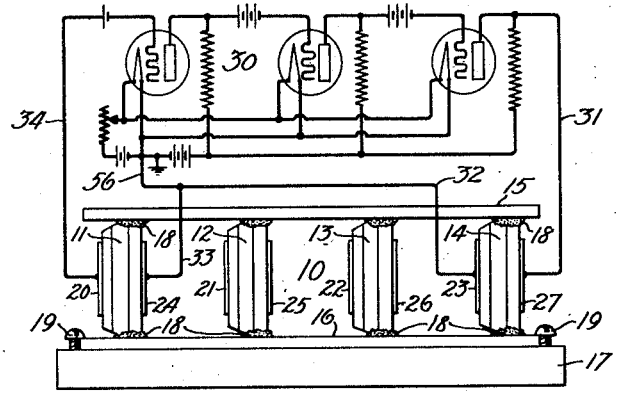
Figure 2:
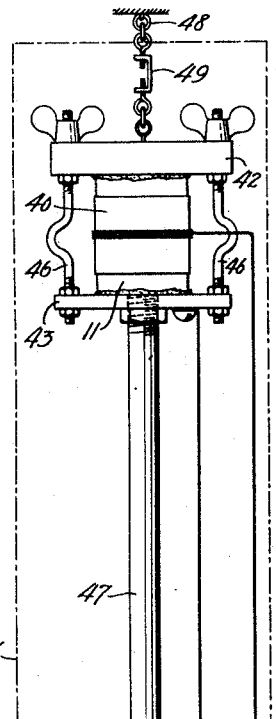
Figure 2:
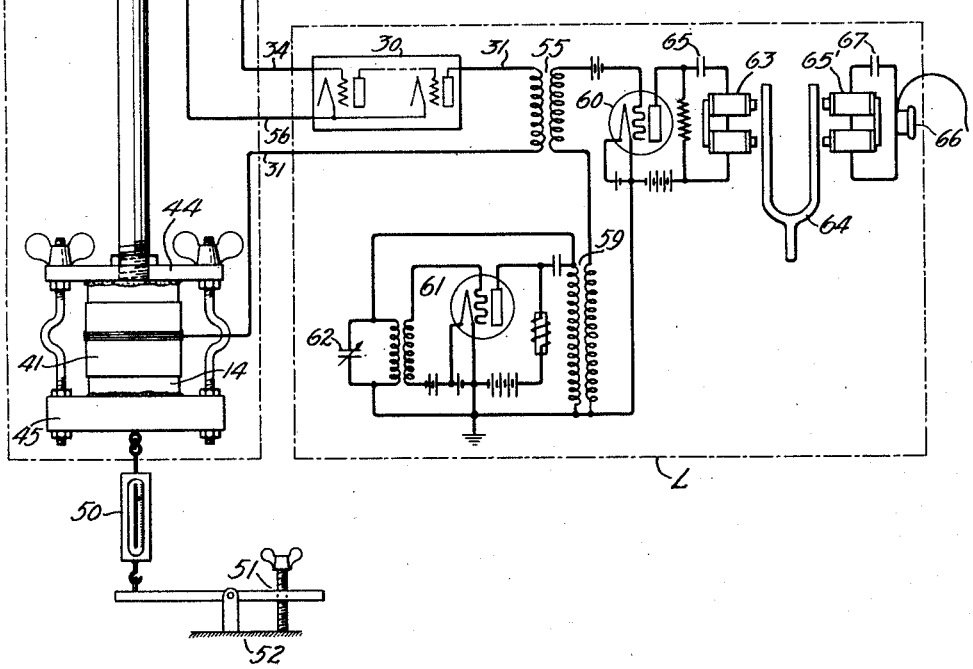
Figure 3:
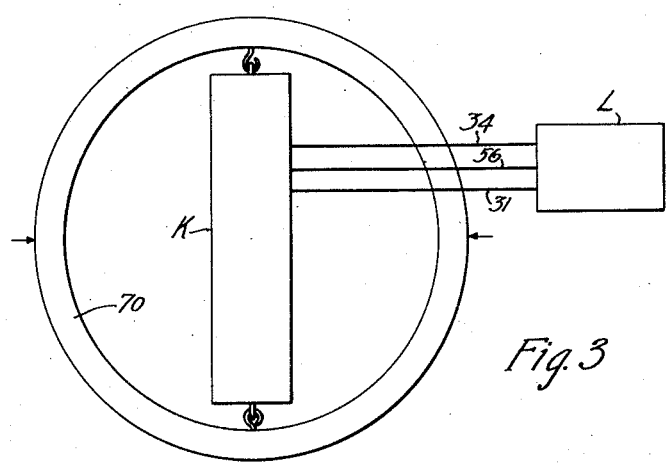
Figure 4:
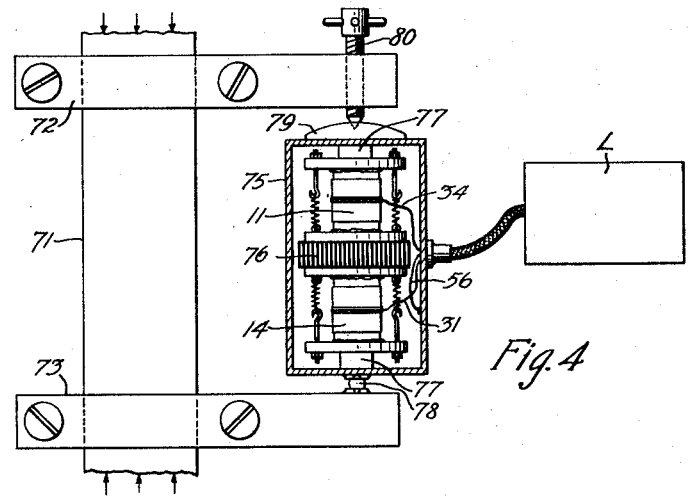
Figure 5:
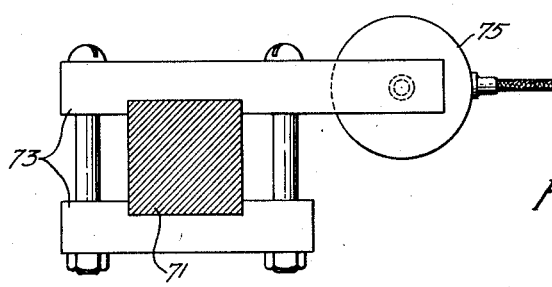

In the accompanying drawings of illustrative forms of the invention, Fig. 1 shows an electron discharge oscillator having a feed-back connection comprising two piezo-electric crystals mechanically coupled; Fig. 2 shows how tensional stresses may be measured with an oscillator having a feed-back connection comprising two piezo-electric crystals mechanically coupled; Fig. 3 indicates how the apparatus of Fig. 2 may be embodied in a system for measuring compressional forces or stresses; Figs. 4 and 5 are front and bottom plan views, respectively, of one form of apparatus, and Fig. 6 a view of another form of apparatus for measuring compressional forces with the use of an oscillator feed-back connection comprising two crystals and a mechanical coupling member therefor; and Figs. 7 and 8 are front and top plan views of a modified tensional stress measuring scheme for measuring tensional forces with the aid of such an oscillator feed-back connection.

In Fig. 1 the reference character 10 designates a piezo-electric structure comprising a plurality of separate piezo-electric crystals 11, 12, 13 and 14 mechanically coupled, the mechanical coupling means being indicated as plates 15 and 16, of any suitable material, and a base 17, also of any of various suitable materials. For instance, plates 15 and 16 may be of glass and the base 17 of wood. The crystals are indicated, by way of example, as of a type shown in Figs. 3 and 4 of my Patent No. 1,414,370, dated May 2, 1922. The ends of the crystals may be cemented to the glass plates, as indicated at 18, and the plate 16 may be fastened to base 17, for instance as indicated by clamping screws 19. As in Fig. 4 of the Patent No. 1,414,370, the crystals are provided with front electrodes and back electrodes, the front electrodes being designated 20, 21, 22 and 23 and the back electrodes being designated 24, 25, 26 and 27.

The amplifier 30, shown by way of example as of a multi-stage, resistance-coupled electron discharge type, has its output leads 31 and 32 connected to the opposite electrodes, respectively, of one of the crystals. As shown, the plate lead 31 is connected to the electrode 27 on the back of crystal 14 and the filament lead 32 is connected to the front electrode 23 of that crystal. The amplifier 30 has its input leads connected to the opposite electrodes, respectively, of another one of the crystals. As shown, the filament lead 33 is connected to the electrode 24 on the back of crystal 11 and the grid lead 34 is connected to the front electrode 20 of that crystal.

In the operation of the apparatus of Fig. 1, alternating electromotive forces from amplifier 30 applied to electrodes 27 and 23 through leads 31 and 32 cause elastic vibrations of crystal 14 which are communicated to crystal 11 by means of the mechanical coupling between these two crystals. The resulting elastic vibrations of crystal 11 generate alternating electromotive forces across electrodes 24 and 20, and these electromotive forces are applied to the filament and grid of the amplifier 30 through leads 33 and 34. The output of the amplifier thus feeds energy to the input of the amplifier, and when the amplification of this input energy by the amplifier is sufficient, the system oscillates. The frequency of sustained oscillation is governed by the frequency of maximum responsiveness or the resonance frequency, or the frequency of maximum power transmission of the piezo-electric structure 10. This frequency is in turn dependent upon the natural frequency of vibration (in the mode involved) of the mechanical coupling between crystals 14 and 11 or the frequency of maximum efficiency of mechanical energy transmission of the mechanical coupling between the motor crystal 14 and the generator crystal 11. In case the structure 10 includes crystals other than the ones acting as motor and generator, these other crystals, of course, form part of the mechanical coupling between the motor and generator crystals. Thus, the presence of crystals 12 and 13 of Fig. 1 affect the frequency of the oscillator formed by the structure 10, the amplifier 30 and their connections. With the connection shown in Fig. 1, no use is made of the piezo-electric properties of crystals 12 and 13. However, this figure is intended to indicate that any of a plurality of crystals may be used as a motor or motors, and any other or others of the crystals as a generator or generators; but the interconnections between the amplifier and the structure 10 should not be so made that the electromotive forces fed into the input of the amplifier will be of such phase as to prevent instead of cause oscillations. That is, E. M. F. variations applied to the input of the amplifier should not, after transmission through the amplifier and the structure 10, return to the input of the amplifier with 180 degrees phase change. By employing resistance coupling with the amplifier rather than reactive couplings, any tendency which the reactances might have to affect the frequency of oscillation is avoided.

In Fig. 2 crystals 11 and 14 may be like those designated by the same reference characters, respectively, in Fig. 1, but in Fig. 2 each of these crystals, instead of having its back and front surfaces provided with different electrodes, has a girdle electrode and an electrode of sign opposite to that of the girdle electrode at each basal plane of the crystal, after the fashion of the girdle electrodes and basal plane electrodes of the crystal in Fig. 12 of my article on "The Piezo-Electric Effect in the Composite Rochelle Salt Crystal", Transactions of the American Institue of Electrical Engineers, volume 38, part 2, beginning on page 1467. The girdle electrode of crystal 11 is shown at 40 in Fig. 2, and the girdle electrode of crystal 14 is shown at 41. The electrodes at the top and bottom basal planes of crystal 11 are shown at 42 and 43, respectively, and the electrodes at the top and bottom basal planes of the crystal 14 are shown at 44 and 45, respectively. The ends of the crystals may be cemented to these basal plane electrodes, as shown, the top and bottom basal plane electrodes for each crystal being connected by bow spring connector rods 46 and forming compressor plates for axially compressing the crystal. The plates 43 and 44 are connected by a rod or wire 47 rigidly fastened to each. The piezo-electric structure, comprising the two crystals and their housings and the connecting member 47, is suspended from a fixed support 48 by means of a turn buckle 49, which provides for adjusting the length of the suspension. A spring balance 50 is suspended from plate 45 and tensions may be applied to the spring balance by a tensioning means 51 mounted on a fixed support 52.

In Fig. 2 there is provided an amplifier 30, which may be like the amplifier 30 of Fig. 1, but has in its plate lead 31 the primary winding of a transformer 55. The grid lead 34 of the amplifier is connected to girdle electrode 40, the plate lead 31 is connected to girdle electrode 41 and the electrodes 42 to 45, which are all electrically connected together by means of elements 46 and 47, are connected to the filaments of the amplifier by a lead 56 corresponding to lead 56 of Fig. 1.

The secondary winding of transformer 55 is connected in series with the secondary winding of a transformer 59 in the grid circuit of a modulating and detecting tube 60, the transformer 59 being an output transformer of an electron discharge oscillator 61, which has a feed-back circuit comprising a variable condenser 62 so calibrated that the oscillator can be used as a frequency standard of variable frequency.

In the output circuit of tube 60 is a magnet 63 for operating a tuning fork 64, the inductance of the magnet cooperating with the capacity of a condenser 65 to form a circuit tuned to the frequency of the fork. When the fork vibrates, it generates an alternating E. M. F. in the winding of a permanent magnet 65', which cooperates with the inductance of a telephone receiver 66 or other detecting means and the capacity of a condenser 67 to form a circuit tuned to the frequency of the E. M. F. generated by the vibration of the fork.

In Fig. 2, alternating E. M. F. from the output of amplifier 30 is impressed upon the electrodes of crystal 14 through leads 31 and 56, causing axial and torsional vibrations of that crystal. Member 47 transmits these vibrations to crystal 11, which therefore impresses corresponding E. M. F. variations upon the input circuit of the amplifier 30 through leads 34 and 56, so that if the amplification of the amplifier is sufficiently great, sustained oscillations will be generated in the system comprising the amplifier 30 and the piezo-electric feed-back apparatus within block K. It will be noted that plates 42 and 45 are shown as more massive than plates 43 and 44, respectively. This showing is intended to indicate that plates 42 and 45 may act as reflecting means for the elastic vibrations of the crystals, to facilitate the straining of member 47 by stresses applied to it by crystal 14.

By varying the steady tension applied to the spring balance 50 by apparatus 51, the frequency of the oscillations can be varied, since the frequency of the maximum efficiency of transmission of mechanical energy through member 47 depends upon the tension applied to that member.

If the frequency of oscillation be measured for different observed values of tensional forces applied to plate 45 (other conditions, for instance the temperature of the apparatus in block K, remaining the same), a curve can be plotted between the tension exerted on the apparatus of block K and the frequency of the oscillations generated by amplifier 30. Any suitable wave meter, frequency meter or other frequency measuring means may be employed in obtaining this curve. The means indicated in the drawings, by way of example, comprise the oscillator 61, the modulator 60, and the fork 64 and receiver 66. For each setting of device 51 condenser 62 may be so adjusted as to cause the beat frequency resulting from the oscillations of amplifier 30 and those of oscillator 61 (when the latter is, say, of higher frequency than the former) to be such that the beat current, delivered by the tube 60, is of the frequency of fork 64 and therefore actuates receiver 66.

When the tension-frequency calibration curve has been obtained, the spring balance 50 will no longer be necessary in order to determine the magnitude of any tension applied to the plate 45, since the frequency of the oscillations generated by amplifier 30 for the applied tensions can be measured and the magnitude of the tension can then be read off from the curve.

Fig. 3 shows how the apparatus of blocks K and L of Fig. 2 can be used to measure compressional force, the force being applied to a ring or the like 70, as indicated by the arrows in Fig. 3, and the apparatus of block K being connected across a chord or diameter of the ring, as it was connected between the support 48 and spring balance 50 in Fig. 2. The ring may be of any suitable material, for example, cast iron.

The compressional force applied to the ring causes a tension in the apparatus of block K. A calibration curve between forces applied to the ring and frequency of the corresponding oscillations generated in amplifier 30 can be obtained in a manner similar to that described in connection with Fig. 2. The magnitude of an unknown compressional force exerted on the ring can then be determined by observing the frequency generated in amplifier 30 and reading off from the calibration curve the magnitude of the force.

In Figs. 4 and 5, a member 71, which may be, for instance, a strut in a building structure, truss or the like, (not shown), is in compression in the direction indicated by the arrows. Where it is desired to know whether the stress changes over a period of time, as for instance, over a period during which there is reason to expect that such a change may occur due to settling of some part of the structure, a clamp 72 and a clamp 73, or the like, may be rigidly attached to the member 71, as indicated in the drawings, at the beginning of the period, and there may be mounted between the clamps a casing 75 containing two piezoelectric crystals 11 and 14, the crystals being mounted between compressor plates and provided with electrodes after the fashion shown in Fig. 12 of the A. I. E. E. article referred to above. A resilient member, for instance a block such as is shown at 76, may be interposed between the upper compressor plate of crystal 14 and the lower compressor plate of crystal 11. Although the material of block 76 should be elastic, it is preferably more easily deformable than the material of crystals 11 and 14 where, as shown in the drawings, the block is thin in comparison to the length of the crystals. The block may, in such case, be of wood, for example. Blocks 77, interposed between the casing 75 and the upper compressor plate of crystal 11, and between the casing 75 and the lower compressor plate of crystal 14, may be of cast iron, steel or the like, and provide clearance spaces, at the end of casing 75, for the nuts used in assembling the crystals between the compressor plates. Although the casing may be of any suitable material and may be relatively flexible or relatively stiff, it is preferably of metal, such as phosphor-bronze, steel or the like, with considerable rigidity, where the stress in the member 71 is great, so that the crystals will be somewhat relieved of stresses applied to the casing. However, the clamps 72 and 73 and the casing and crystals serve to shunt stress around the part of the strut 71 included between the clamps, and therefore the static force transmitted to the casing and the crystals by the clamps 72 and 73 may be small compared to the stress in the strut 71. Preferably, the mounting of the casing 75 between clamps 72 and 73 is such as to obviate, as far as is practical, the application of any torsional stresses to the casing 75 by clamps 72 and 73. As shown, the casing is provided with a ball bearing 78 between its lower end and clamp 73, and a plate or block 79 on the top of the casing is provided with a recess for receiving the pointed end of a capstan screw 80 or the like, which threads through clamp 72 and affords means for applying any desired degree of pressure to the casing. Leads 34, 31 and 56, corresponding to the leads 34, 31 and 56, respectively, of Figs. 1 to 3, are taken out from the casing 75 through an opening which is preferably sealed so that casing 75 will be air-tight and moisture-proof. The leads 34, 31 and 56 may be used to connect the crystals to the amplifier 30 (not shown) in block L, as the correspondingly designated leads in Figs. 2 and 3 connected the crystals of those figures to amplifier 30 in block L.

If the amplification in amplifier 30 is sufficiently great, the feed-back through the piezo-electric crystal structure will cause the amplifier to generate sustained oscillations and the frequency of the oscillations generated by amplifier 30 at any time will depend upon the compression exerted on the casing 75 and the compression in block 76 at that time. Therefore, if the frequency of the oscillations be measured at the beginning of the above mentioned period during which a change in the compression in member 71 might be expected, and if during the period or subsequent thereto the frequency of oscillation be measured again under the same conditions as regards the temperature of elements 71 to 80, the adjustment of screw 80, etc., a comparison of the two frequencies which are obtained as the results of the measurements will indicate whether the compression in the member 71 has changed.

If desired, the system shown in Figs. 4 and 5 may be calibrated in the manner described in connection with Fig. 2, by applying known forces to member 71 in the direction of the arrows.

Fig. 6 shows how a compressional force on a member 84 may be measured as a function of the torsional rigidity of the member. The force to be measured is applied to block 85 in the direction indicated by the arrows so that the coefficient of rigidity of member 84 is modified for an appreciable part of its volume. Piezo-electric crystals 11 and 14 are provided with girdle electrodes and basal plane electrodes, or compressor plates, connected to the apparatus of block L by leads 34, 31 and 56, after the fashion described in connection with Figs. 2 to 4, and are mounted in recesses in the ends of member 84 by rigidly attaching the outer compressor plates 88 and 89, respectively, of the crystals to the ends of the member 84, for instance by means of screws 90. The recesses may thus be air-tight and moisture-proof. The inner compressor plates 91 and 92, respectively, of the crystals, preferably have considerable mass to reflect torsional elastic vibrations of the crystals.

If the amplification in amplifier 30 (not shown) in block L is sufficiently great, the feed-back through the piezo-electric crystal structure including member 84 will cause the amplifier to generate sustained oscillations, the member 84 undergoing torsional elastic vibrations at its frequency of resonance for such mode of vibration, the frequency of the oscillations depending upon the magnitude of the forces applied to block 85. The system may be calibrated in the manner described in connection with Fig. 2 by applying known forces to the block 85 and observing the corresponding frequencies of oscillation.

In Figs. 7 and 8 a cord, or rod, or wire, or the like, 95, is anchored at its left-hand end to a bracket 96 rigidly attached to a base 97, the anchorage preferably being made through a spring 98. The right hand end of the element 95 is attached to a cord 100 or the like which passes over a pulley 101 mounted on base 97 and is tensioned, for instance, by a weight or weights 102 attached to the element 95. Two crystals 11 and 14, mounted between compressor plates and provided with electrodes after the fashion shown in Fig. 2 have their lower compressor plates rigidly attached to the base 97, which may be of any suitable material, for instance, wood, or steel. Where the base is of electrically conducting material, it may serve as an electrical connection between the lower basal plane electrodes or compressor plates of the two crystals. Leads 31, 34 and 56 connect the crystal electrodes to amplifier 30 (not shown) in block L, just as the correspondingly designated leads connect the crystal to the amplifier 30 in Fig. 2.

Between the upper compressor plate of crystal 11 and the upper basal plane of that crystal is interposed an arm or plate 105 for applying torsion to the crystal. The contact between member 105 and the upper compressor plate of the crystal is preferably a point contact, the member or the compressor plate preferably having a pointed or semi-spherical protuberance, as indicated at 106, to provide this pivotal connection. The upper basal plane of the crystal may be cemented to the member 105, instead of to the upper compressor plate of the crystal as in Figs. 2, 4 and 6. The member 105 carries a screw clamp 107 or the like through which the element 95 passes so that the elements 95 and 105 may be engaged loosely or rigidly as desired.

A torsion arm or plate 110 is rigidly attached to the top of the upper compressor plate of crystal 14, preferably by means of the bow spring rods used to draw the upper and the lower compressor plates toward each other. The arm 110 carries a screw clamp 111 or the like, through which the elements 95 passes so that the elements 95 and 110 may be engaged loosely or rigidly as desired.

Preferably, the element 95 is first tensioned by a weight at 102 and then the clamps 107 and 111 are tightened on the element sufficiently to enable the element to transmit elastic vibrations of crystal 14 to crystal 11. Thus, weight 102 is supported by the element 95, without undue strain upon the crystals and their housings. If the amplification in amplifier 30 is sufficiently great, the feed-back from the amplifier output to the amplifier input, through the motor crystal 14, the element 95 and the generator crystal 11 will cause the amplifier to generate sustained oscillations, the frequency of these oscillations being dependent upon the magnitude of the tension in the part of the element 95 connecting arms 105 and 110. The magnitude of this tension may be varied by varying the magnitude of weight 102. The system can be calibrated, in the manner described in connection with Fig. 2, by adding known weights at 102 and obtaining a curve between the added weights and the observed frequencies corresponding thereto. The spring 98 increases the freedom of action of the crystals and the part of element 95 coupling the crystals.

My application Serial No. 631,859 filed April 13, 1923, claims broadly an amplifier or oscillator with a piezo-electric feed back connection.

The general principles herein disclosed may be embodied in many organizations widely different from those illustrated without departing from the spirit of the invention as defined in the appended claims. In particular since a piezoelectric crystal, in an oscillation generating organization under the control of the crystal, simulates an electric reactance the value of which has a part in the determination of the frequency, like a reactance in the frequency determining circuit of any other oscillation generating organization, it is obvious that a change in frequency of a piezoelectric crystal, however induced, may be thought of as a reactance change.

What is claimed is:

1. In combination, an amplifier having an energy input path and an energy output path, a piezo-electric body associated with one of said paths, and a path for transferring energy between said body and the other of said first two paths, said third path comprising means of mechanical nature different from that of said body for mechanically transmitting energy between two points in said third path.

2. An amplifier, and means for causing said amplifier to generate sustained oscillations, said means comprising a plurality of separate piezoelectric bodies associated with said amplifier, and piezo-electrically inactive means mechanically coupling said bodies.

3. In combination, an amplifier, a piezo-electric body fed by said amplifier, a mechanical coupling engaging said body and having mechanical properties different from those of said body, and a second piezo-electric body engaged by said coupling and feeding said amplifier.

4. An amplifier having an energy input path and an energy output path, means for causing said amplifier to generate sustained oscillations, said means comprising electro-dynamic means associated with said input path, electro-dynamic means associated with said output path, and means mechanically coupling said two first mentioned means, and means for controlling the frequency of said oscillations, said last means comprising means for distorting said coupling means.

5. In combination, an amplifier having an energy input path and an energy output path, means for causing said amplifier to generate sustained oscillations, said means comprising a path for mechanically transmitting energy between said first two paths, and means for controlling the frequency of said oscillations, said last means comprising means for applying mechanical force to said third path.

6. In combination, two elements, a path for mechanically transmitting energy waves between said elements, and means for controlling the frequency of the energy transmitted by said path, said means comprising means for applying a steady mechanical force to said path.

7. In combination, a path for transmitting energy waves, said path comprising two piezo-electric bodies and means mechanically coupling said bodies, and means for controlling the frequency of said waves transmitted by said path, said last means comprising means for applying a steady mechanical force to said coupling means.

8. In combination, an oscillator having an input circuit, an output circuit and a feed-back connection between said circuits, said connection comprising two piezo-electric bodies and means mechanically coupling said bodies, means for controlling the frequency of said oscillator, said last means comprising means for applying mechanical force to said coupling means and means for measuring the frequency of oscillation.

9. In apparatus for detecting substantially steady stresses in a structure, means comprising an oscillator having a feed-back connection including piezo-electric energy transferring means, and means for shunting mechanical stress from said structure through said energy transferring means.

10. In apparatus for detecting substantially steady stresses in a structure, means comprising an oscillator having a feed-back connection, and means for shunting mechanical stress from said structure through said connection.

11. A frequency control system for high frequency electrical apparatus consisting of a multiplicity of piezo-electric elements operating in synchronism.

12. In a frequency control system for electron tubes, the combination of a multiplicity of piezo-electric elements operating in synchronism, an electron tube system, and means for integrating the effect of said piezo-electric elements on said electron tube system.

13. In a system for controlling alternating currents, the combination of a work circuit, and means for controlling the influence of alternating currents upon said work circuit comprising a multiplicity of piezo-electric elements operating in synchronism, for integrating the effect of all of said elements upon said work circuit.

14. A frequency control or stabilizing system for electron tubes, the combination of an electron tube system, and a multiplicity of piezo-electric elements, means for synchronizing the operation of said piezo-electric elements, and means for integrating the effect of the synchronized piezo-electric elements upon said electron tube system.

15. Piezo-electric crystal apparatus comprising in combination a piezo-electric plate, a pair of flat conductive members for supporting said piezo-electric plate, and means for subjecting said plate to pressure or releasing pressure therefrom for shifting the operating frequency thereof, said means comprising a lever member pivotally mounted adjacent said flat conductive members.

16. Piezo-electric crystal apparatus comprising in combination a piezo-electric plate, a metallic electrode for supporting said piezo-electric plate and establishing electrical connection with one face of said piezo-electric plate, a lever member pivotally mounted adjacent said metallic electrode, a second metallic electrode carried by said lever member and adjustable with respect to said piezo-electric plate for varying the pressure therebetween, and spring means acting through said lever for so varying the pressure of said second electrode upon said piezo-electric plate.

17. The method of varying the responsive frequency of a piezo-electric crystal oscillator which comprises subjecting the crystal oscillator to electrode pressure.

18. The method of selectively adjusting the frequency of a piezo-electric crystal oscillator which consists in selectively applying electrode pressure to said crystal oscillator.

19. In a piezo-electric crystal oscillator system the method of shifting the frequency of the crystal oscillator which consists in subjecting the crystal to variable pressure for selectively sustaining a desired frequency.

20. Piezo electric crystal apparatus comprising in combination with an electron tube oscillator, a piezo-electric crystal for sustaining oscillations generated by said oscillator, a pair of conductive electrodes connected with said oscillator and disposed on opposite sides of said crystal and a manually controllable device for shifting the frequency of said piezo electric crystal oscillator.

21. Piezo electric crystal apparatus comprising, in combination, an electron tube having grid, cathode and plate electrodes, an input circuit interconnecting said grid and cathode electrodes, an output circuit interconnecting said cathode and plate electrodes, a piezo electric crystal, a pair of conductive plate members for supporting said piezo electric crystal, and manually adjustable means operatively connected to one of said conducting plate members whereby the frequency at which said piezo electric crystal sustains oscillations in said electron tube circuit may be varied at will.

22. The combination of a vacuum tube system, a piezo-electric element placed between a pair of electrodes and associated with the vacuum tube system to control the frequency therein, and means including a screw threaded member to selectively vary the frequency in said system.

23. The combination of an oscillator capable of generating any wave within the limits of a predetermined band, a piezo-electric device associated with said oscillator, and means for increasing or decreasing the period of said piezo-electric device by any desired amount so that the oscillator may sustain oscillations of any selected frequency within the predetermined band.

24. An electro-mechanical system having in combination a vacuum tube, a grid, a plate and a filament actively cooperating therein, an electro-mechanical vibrator forming an electrical admittance between said grid and filament for determining the oscillation frequency of said system, a plate circuit through said tube, and means for adjusting the frequency of vibration of said vibrator.

25. An electro-mechanical system having in combination, a vacuum tube, a grid, a plate and a filament actively cooperating therein, an electro-mechanical vibrator forming an electrical admittance between said grid and filament, said system being adapted to oscillate with a frequency determined by said electro-mechanical vibrator and essentially independent of random variations of the electrical constants of the system, a plate circuit through said tube, and means for adjusting the frequency of vibration of said vibrator.

26. Apparatus of the character described comprising a holder having two electrodes, an electro-mechanical vibrator disposed in the holder between the electrodes, and means for relatively adjusting the vibrator and the electrodes so as to vary the pressure therebetween.

27. Piezoelectric crystal apparatus comprising in combination an electron tube having grid, cathode and plate electrodes, an input circuit interconnecting said grid and cathode electrodes, an output circuit interconnecting said cathode and plate electrodes, a piezoelectric crystal, a pair of plate members for supporting said piezoelectric crystal and connecting said crystal with said electron tube circuit and manually adjustable means comprising a screw arrangement suspended over the said crystal for adjusting the plate member adjacent to said screw arrangement relative to said piezoelectric crystal to vary the pressure therebetween and therefore to shift the frequency at which said piezoelectric crystal sustains oscillations in said electron tube circuits.

28. A piezoelectric element, a plurality of electrodes for said element, and means including at least one of said electrodes for adjusting the frequency or period of vibration of said piezo-electric element to a desired value.

29. An amplifier comprising input and output electrodes, and means for causing said amplifier to generate sustained oscillations comprising a plurality of separate piezo-electric bodies intercoupling said input and output circuits.

30. In a heterodyne system, a given high frequency generator, a second high frequency generator, and means to combine the output products of said generators to produce a relatively low frequency wave, said second high frequency generator being of the fixed frequency type whereby there may be preserved in the resultant relatively low frequency wave, a variable frequency or the like characteristic of the wave from said given high requency generator.

31. An oscillatory system having, in combination, an amplifying relay, a source of energy, an electromechanical vibrator, and means connecting the relay, the source and the vibrator together to constitute an oscillatory system, the electrical parameters of the system being such as to render the system stably non-oscillatory when not under the control of the vibrator and such that the frequency of the oscillations of the system when the system oscillates will be substantially constant and determined by a frequency of torsional vibration of the vibrator.

32. In an oscillation generator, piezo-electric crystal frequency controlling means, and means for governing the crystal frequency.

33. In combination, a piezo-electric crystal, and means for governing the frequency at which such crystal will oscillate.

34. In combination, an oscillating crystal, a container within which the crystal is mounted and means external to the container for varying the frequency of oscillation of said crystal.

35. A system for selectively transmitting oscillatory energy comprising in combination, two piezo-electric bodies and a non-piezo-electric mechanical vibratory element coupling said bodies and adapted, with said bodies, to determine the transmission frequency of the system.

36. An oscillation generator comprising in combination, an amplifier having an input circuit and an output circuit, a mechanical resonance frequency determining device, and means including a piezo-electric body associated in energy transfer relation to said device for coupling the same with the input and output circuits of said amplifier.

37. An oscillation generator comprising in combination, an amplifier having an input and an output circuit, a feedback circuit, including a piezo-electric body adapted to react electrically to determine the frequency fed back, and a variably conditioned mechanical loading element associated with said piezo-electric body to permit variations of frequency at which said body tends to vibrate.

38. An oscillatory system having, in combination, an amplifying relay, a source of energy, an electro-mechanical vibrator, and means connecting the relay, the source and the vibrator together to constitute an oscillatory system, the electrical parameters of the system being such as to render the system stably non-oscillatory when not under the control of the vibrator and such that the frequency of the oscillations of the system when the system oscillates will be substantially constant and determined by a frequency of longitudinal vibration of the vibrator.

39. Piezo-electric crystal apparatus comprising in combination a piezo-electric plate, a pair of conductive members for establishing electrical connection with opposite faces of said piezo-electric plate, and means for selectively subjecting said piezo-electric plate to pressure for shifting the frequency of operation thereof.

40. Piezo-electric crystal apparatus comprising in combination a piezo-electric plate, a pair of flat conductive members for supporting said piezo-electric plate, and means for subjecting said plate to pressure or releasing pressure therefrom for shifting the operating frequency thereof.

41. An oscillatory system having, in combination, a hermetically sealed container having therein a cathode and a plurality of cold electrodes, circuits connecting said cold electrodes with said cathode, a piezo-electric crystal, means connecting the crystal in the system, the parameters of the system having electrical characteristics such as to render the system oscillatory under the control of the crystal at a substantially constant frequency determined by a mode of vibration of the crystal, and such as to render the system stably non-oscillatory when not under the control of the crystal, and mechanical means for varying the frequency at which the crystal oscillates.

42. An oscillatory system having, in combination, a vacuum tube having three electrodes, namely, a cathode, a grid and a plate, a circuit including two of the electrodes, an electromechanical vibrator, means connecting the vibrator with one of the said two electrodes and with the third electrode to constitute an oscillatory system, the parameters of the system having electrical characteristics such as to render the system oscillatory under the control of the crystal at a substantially constant frequency determined by the mode of vibration of the crystal, and such as to render the system stably non-oscillatory when not under the control of the crystal, and means comprising a movable element for varying the frequency at which the crystal oscillates.

43. In an alternating current circuit a reactive piezoelectric device comprising a piezoelectric element, electrodes between which said element is mounted, and means for exerting pressure on said element to vary the alternating current reactance of said device.

ALEXANDER M. NICOLSON.